United States Patent

Dupont et al.

[11] Patent Number: 5,772,262
[45] Date of Patent: Jun. 30, 1998

[54] QUICK CONNECTOR FOR PLASTIC TUBING

[75] Inventors: Paul Robert Dupont, Andover; Richard B. Schwarz, Lincoln Park, both of N.J.

[73] Assignee: Rubber-Fab, Inc., Andover, N.J.

[21] Appl. No.: 833,027

[22] Filed: Apr. 3, 1997

[51] Int. Cl.[6] ................................................ F16L 33/00
[52] U.S. Cl. ........................ 285/257; 285/242; 285/401; 285/360
[58] Field of Search ................................ 285/257, 259, 285/360, 361, 401, 242

[56] References Cited

U.S. PATENT DOCUMENTS

| | | | |
|---|---|---|---|
| 1,179,552 | 4/1916 | Nelson | 285/257 |
| 2,314,000 | 3/1943 | Lusher et al. | 285/257 |
| 2,679,409 | 5/1954 | Spender et al. | 285/257 |
| 3,589,752 | 6/1971 | Spencer | 285/257 |
| 3,724,882 | 4/1973 | Dehar | 285/257 |
| 4,500,118 | 2/1985 | Blenkush . | |
| 4,703,957 | 11/1987 | Blenkush . | |
| 4,903,995 | 2/1990 | Blenkush et al. . | |

FOREIGN PATENT DOCUMENTS 630784  10/1949  United Kingdom ................... 285/257

OTHER PUBLICATIONS

Catalog Oct. 1985 Ark–Plas Products Inc., Flippin, AR "Miniature Plastic Fittings and Acceswsories".
Catalog No Date Value Plastics Inc., Ft. Collins, Co "Miniature Plastics Fittings 200 Series".

Primary Examiner—Eric K. Nicholson
Attorney, Agent, or Firm—Howard R. Popper

[57] ABSTRACT

A two-piece connector includes a collar having an aperture in its relatively thick end-wall which bears an internal annular groove. The skirt of the collar is adapted to be slipped over the end of a length of tubing and contains tines to graspingly engage the outer surface of the tubing. The barb portion of the connector is adapted to fit through the aperture in the end-wall to frictionally engage the lumen of the tubing. An interrupted flange at the upper portion of the barb is adapted to twistably engage the internal annular groove in the end-wall to securely lock the barb to the collar.

5 Claims, 3 Drawing Sheets

5,772,262

QUICK CONNECTOR FOR PLASTIC TUBING

TECHNICAL FIELD

This invention relates to tubing systems and, more particularly, to the connection of fittings to lengths of flexible plastic tubing.

BACKGROUND OF THE INVENTION

A variety of standard fittings are available for making connection to lengths of flexible plastic tubing. Such fittings are typically made of a plastic material that is more rigid than the tubing and which typically have a cylindrical barb portion that can be inserted into the tubing end and that may include a series of chevron-like contours or ridges to facilitate retention of the fitting within in the tubing lumen. When the tubing system will be used to transport low pressure fluids, the natural friction between outside diameter of the fitting and the internal diameter of the tubing may be sufficient to prevent inadvertent disconnection. For tubing systems requiring a greater degree of protection against disconnection, the conventional practice is to apply an external banding of some sort. One banding method employs the familiar nylon strap tie of the type originally used to secure bundles of wires together. While this may be effective in providing a secure connection, the need to use a number of repetitive hand manipulations with small diameter tubing has resulted in workers complaining of fatigue and repetitive stress syndrome. Moreover, the pig-tail of the external strap tie results in an unattractive installation.

SUMMARY OF THE INVENTION

In accordance with the principles of the present invention, in one illustrative embodiment thereof, a two-piece connector is employed. The end of the tubing to which the fitting is to be applied is first cut squarely and then the first portion of the connector, which comprises a collar, is slipped over the end of the tubing to graspingly engage its outer surface. The collar has an end-wall having a circular opening to provide access to the lumen of the tubing for the barb of the connector. On the side walls of the collar, facing the outside diameter of the tubing, there are disposed a series of deflectable tines to provide one-way grasping engagement with the outside surface of the flexible tubing. After the collar is fitted over the tubing end, the second portion of the connector having a cylindrical barb portion sized to frictionally engage the lumen of the tubing is inserted through the circular hole in the end wall of the collar. When the barb is fully inserted into the tubing lumen, the barb may be twisted approximately a quarter turn so that lugs on the barb will engage grooves in the collar end wall to securely lock the barb in place. A stop on the barb limits rotation to the desired amount.

BRIEF DESCRIPTION OF THE DRAWINGS

The foregoing and other objects and features of the present invention may become more apparent when the ensuing description is read together with the drawing in which.

GENERAL DESCRIPTION

Figure 1:
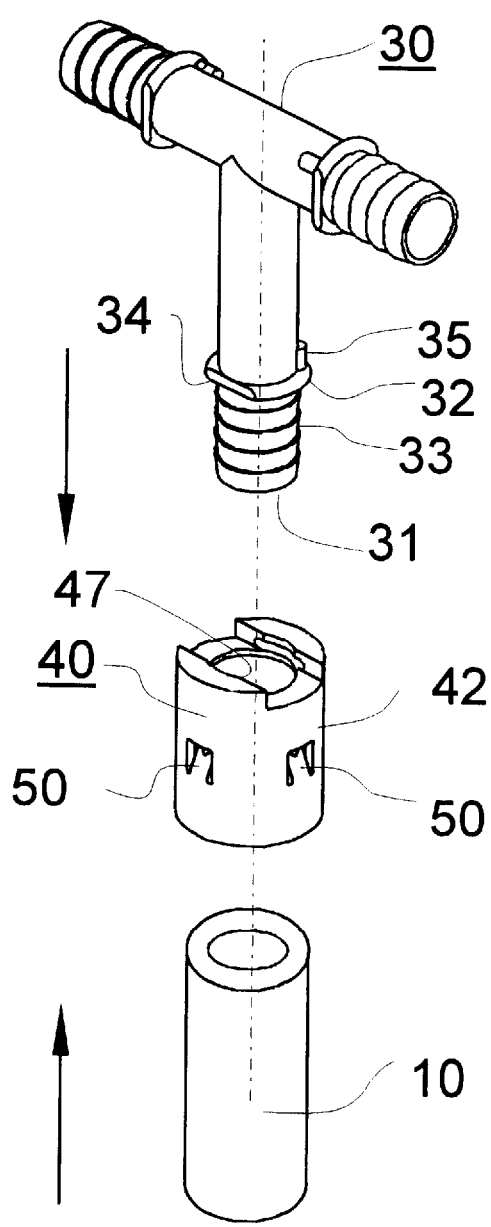
FIG. 1 shows an exploded view of the connector prior to assembly of the barb and collar o a length of plastic tubing.

Referring to FIG. 1 there is shown, in axial, exploded-view alignment, prior to assembly, an illustrative T-fitting 30 and collar 40 comprising the connector of the invention, together with the end of a length of flexible plastic tubing 10 to which the connector is to be attached. The T-fitting 30 includes at least one barb portion 31 sized to snugly penetrate the lumen 11 of tubing 10. The barb is advantageously provided with a series of ridges 33 to facilitate insertion into the tubing lumen and to militate against inadvertent withdrawal therefrom. The arrows indicated the direction in which components 10, 30 and 40 are to be pushed together for assembly.

Figure 2:
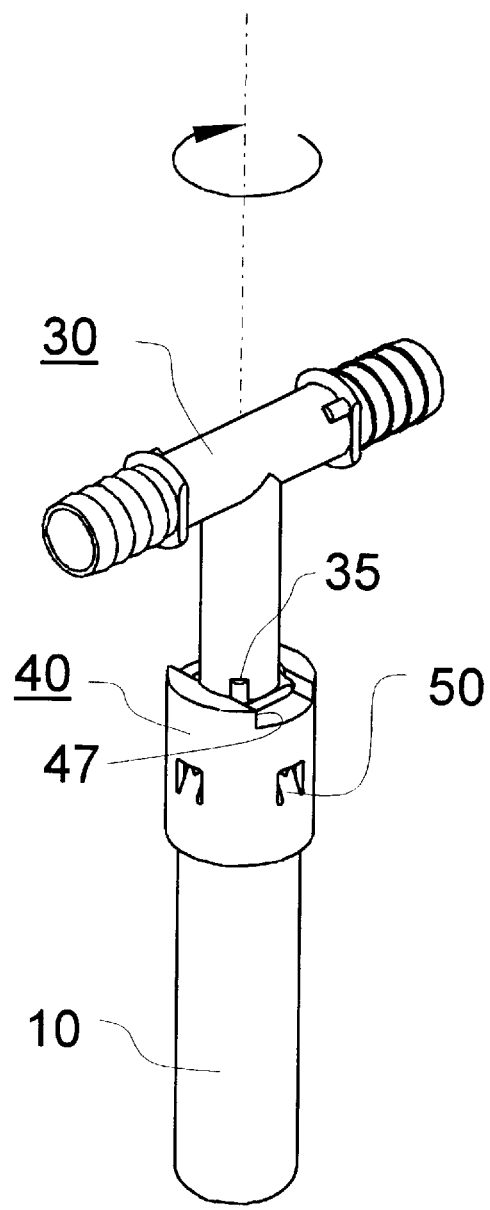
FIG. 2 shows the embodiment of FIG. 1 assembled onto the tubing end.

In FIG. 2 the collar 40 has been forced over the end of tubing 10 and the barb portion 31 of T-fitting 30 has been inserted through the collar into the lumen 11 (see also FIG. 3) of tubing 10. The T-fitting has been twisted approximately one-quarter turn in the direction of the arrow until a lug 35 on the fitting flange 32 hits the stop 47 on the collar. The details of collar 40 are shown in the isometric view, FIG. 4 and in the cross-sectional view, FIG. 5.

Figure 5:
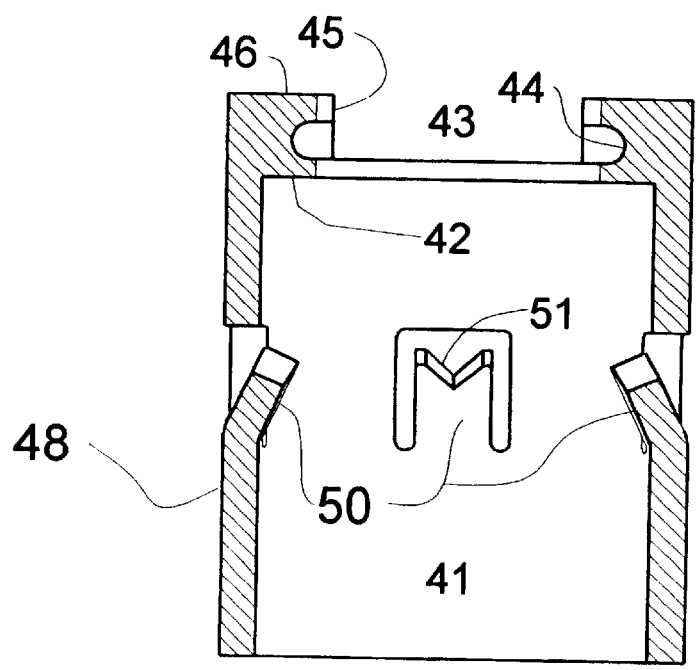
FIG. 5 shows a cross-sectional view of the collar.
Figure 4:
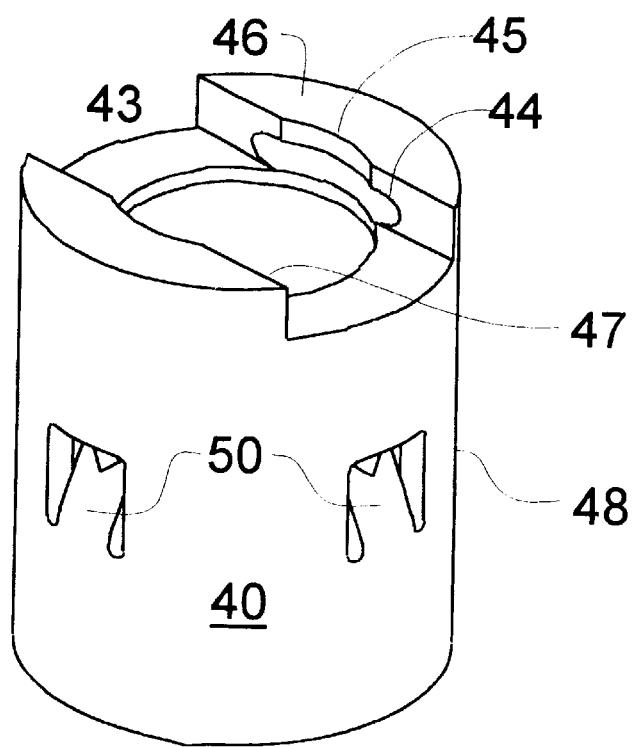
FIG. 4 shows an isometric view of the collar.

In FIGS. 4 and 5 the collar 40 is seen to include an internal end wall 42, an external end wall 46 and an elongated skirt portion 48. Skirt 48 bears a number of tines 50 which extend into the interior 41 of collar 40 for graspingly engaging the outer surfaces of flexible tubing 10. As more clearly shown in FIG. 5, the ends 51 of tines 50 are advantageously notched to increase the grasping action of the tabs on the exterior of the tubing when it is inserted into the collar interior. Typically, the tubing 10 will be inserted until its end comes into contact with the internal end wall 42 of the collar. Once so inserted, the tines 50 prevent the collar from easily being detached from tubing 10. External end wall 46 is notched at 43 for purposes of receiving the blade of flange 32. Between internal end wail 42 and external end wall 46 collar 40 includes a hemitoroidal groove 44 into which the blade portion of flange 32 may be turned after barb 31 has been fully inserted into the lumen of the tubing.

After the collar 40 has been installed onto the end of tubing 10, the barb 31 of fitting 30 is inserted through the circular hole 45 (see FIG. 5) in the end wall 46 of the collar. Barb 31 is advantageously provided with an interrupted flange 32 having flattened portions 34. The flattened portions 34 of flange 32 are aligned with the notch 43 in end wall 46 of collar 40 and the barb is inserted into the lumen 11 of tubing 10. After the barb 31 is inserted into lumen 11, the barb is advantageously twisted so that the blades of flange 32, defined between flats 34, engage grooves 44 in the end of collar 40, thereby locking the barb to collar 40 and preventing it from inadvertently becoming detached therefrom. Rotation of barb 31, once its blades have been seated in grooves 44, is limited by lug 35 (FIGS. 1 and 2) coming into contact with stop 47 of collar 40.

Figure 3:
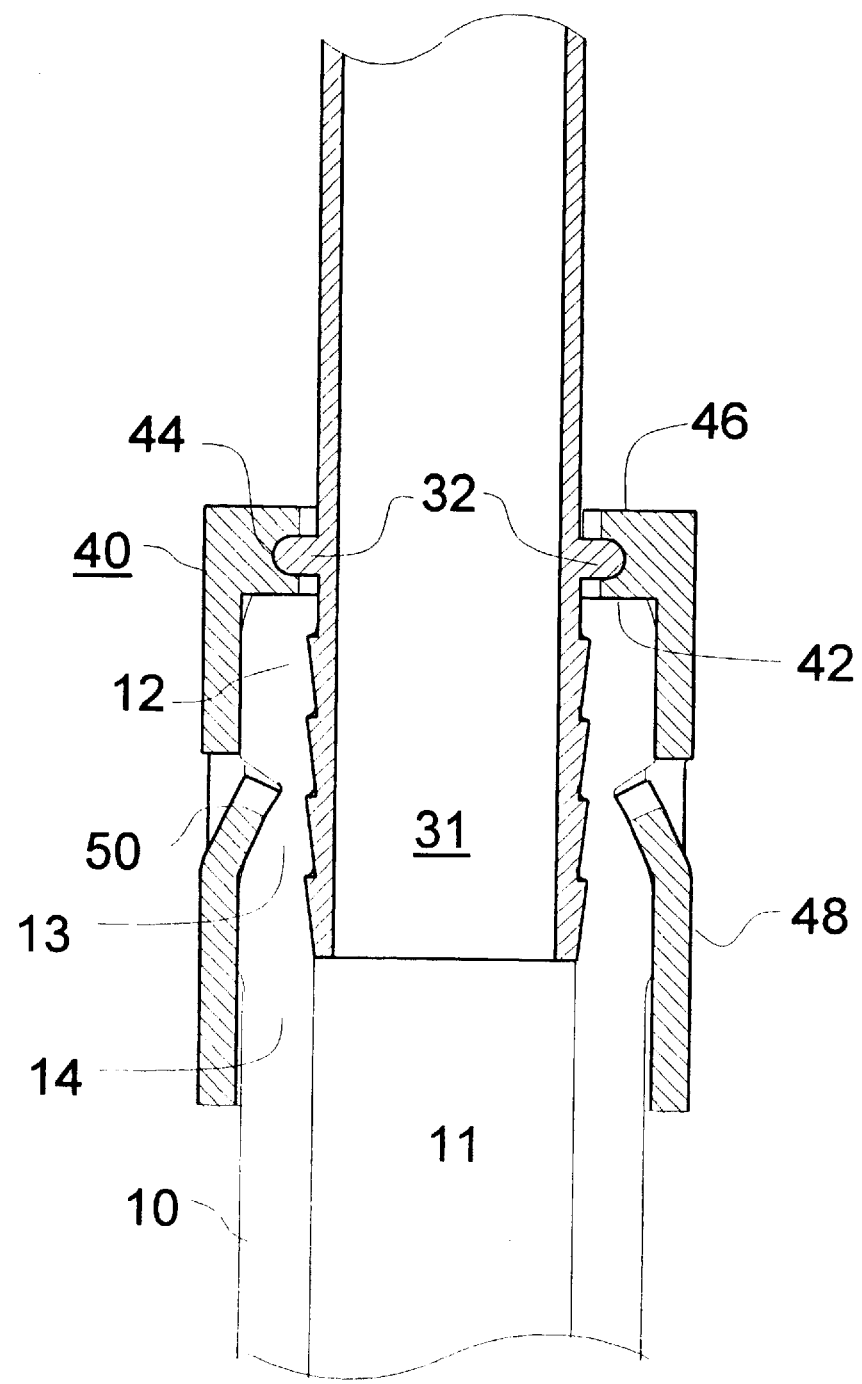
FIG. 3 shows a cross-sectional view of the connector assembled onto the tubing end.

Referring to FIG. 3, the details of the interaction of the barb 31, collar 40 and tubing 10 are shown. Three areas 12, 13 and 14 of the wall of tubing 10 are of concern. In area 12 the tubing wall is held between ridges 33 of barb 31 and collar 40, but not so tightly as to prevent rotation of barb 31 as it is being inserted into the lumen 11 of tubing 10 and then twisted to seat the blade of flange 32 in groove 44. Collar tines 50, in grasping the outer wall of tubing 10, cause the tubing to be somewhat pinched in area 13, thereby preventing the rotational force being applied by the twisting of barb 31 as it is being inserted into the lumen 11 from causing rotation of tubing 10 with respect to collar 40. In addition, in area 13, tines 50 prevent tubing 10 from inadvertently being withdrawn from collar 40 after it has been inserted. In area 14 the tubing wall is constrained against radially outward fluid pressure within the lumen 11 by the elongated skirt 48 of collar 40. Skirt 48 also provides sufficient axial length for the support of tines 50.

What has been described is deemed to be illustrative of the principles of the invention. Further and other modifications, such as manufacturing the collar 40 and barb 31 of similar or dissimilar materials, changing the shape of tines 50, the ridges 33 of barb 31 or of the blade portion of flange 32 will be apparent to those skilled in the art and may be made without however departing from the spirit and scope of the invention.

What is claimed is:

1. A connector for plastic tubing comprising:

a collar (40) adapted to be first fitted over the end of said tubing, said collar having an end-wall (42,) opening (43) to permit access to the lumen of said tubing and an elongated skirt portion (48), said end-wall being relatively thicker than said skirt portion, said opening (43) having annular recess (44) therein, said skirt portion bearing a plurality of tines (50) for grasping the outer surface of said tubing; and a barb (31) adapted to be inserted through said end wall opening, said barb being sized to snugly penetrate the lumen (11) of said tubing; said barb having an interrupted flange (32) for twistably engaging said annular recess (44) of said opening (43), said interrupted flange being adapted to lock said barb into said collar after said collar has been fitted over said tubing end.

2. A connector according to claim 1 wherein a portion (46) of said collar having said annular recess portion (44) projects externally of said end wall (42), said interrupted flange being adapted to engage respective portions of said recess in said collar in a locking quarter-turn relationship.

3. A connector according to claim 2 wherein said collar end wall includes a notch (43) in said portion (46) projecting externally of said end wall, said notch being adapted to receive a flattened portion of said flange of said barb.

4. A connector according to claim 3 wherein said barb includes a stop (35) for limiting rotation of said barb when said portion of said flange has been received in said grooved recess.

5. A connector according to claim 1 wherein said barb includes a series of annular ridges (33) and wherein said tines (51) are adapted to pinch said tubing against said ridges when said tubing is inserted in said collar.

* * * * *